US012792370B2

(12) United States Patent
Zhang et al.

(10) Patent No.: US 12,792,370 B2
(45) Date of Patent: Nov. 10, 2026

(54) VISUAL INTERACTION METHOD AND DEVICE

(71) Applicant: Lenovo (Beijing) Limited, Beijing (CN)

(72) Inventors: Ning Zhang, Beijing (CN); Xuguang Gu, Beijing (CN); Baohai Fu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/977,501

(22) Filed: Oct. 31, 2022

(65) Prior Publication Data

US 2023/0132664 A1 May 4, 2023

(30) Foreign Application Priority Data

Oct. 29, 2021 (CN) ........................ 202111274623.4

(51) Int. Cl.
*G06F 9/451* (2018.01)
*G06F 3/0481* (2022.01)
*H04M 3/51* (2006.01)

(52) U.S. Cl.
CPC ............ *G06F 9/453* (2018.02); *G06F 3/0481* (2013.01); *H04M 3/51* (2013.01)

(58) Field of Classification Search
CPC ...... G06F 9/453; G06F 3/0481; G06F 3/0482; G06F 9/451; H04M 3/51; H04M 3/5166; H04L 51/02; H04N 21/2187
See application file for complete search history.

(56) References Cited

U.S. PATENT DOCUMENTS 6,163,779 A * 12/2000 Mantha ............... G06F 16/9574 715/236
6,314,178 B1 * 11/2001 Walker ................ H04M 3/5166 379/202.01
7,336,779 B2 * 2/2008 Boyer ..................... H04M 3/51 379/265.09
7,519,381 B2 * 4/2009 Klassen ................ H04L 51/216 455/418
9,160,856 B2 * 10/2015 Mairs ...................... H04W 4/16
9,614,964 B2 * 4/2017 Stepanian ............... G06F 21/32
9,826,092 B2 * 11/2017 Sharma ............... H04M 7/0042
9,864,952 B2 * 1/2018 Bell .................... G06F 16/3329
10,535,071 B2 * 1/2020 Sehrawat ............ H04M 3/5141
(Continued)

FOREIGN PATENT DOCUMENTS

CN 105162688 A 12/2015
CN 110971983 A 4/2020

*Primary Examiner* — Matthew Ell
*Assistant Examiner* — Blaine T Basom
(74) *Attorney, Agent, or Firm* — ANOVA LAW GROUP, PLLC

(57) ABSTRACT

A visual interaction method. The control method includes obtaining first input information; outputting visual guidance information for the first input information in response to a query request for the first input information, the visual guidance information being generated when the first input information is in a queuing state and is used to indicate a visual response mode of the query request; and outputting a visual response for the first input information based on the visual response mode in response to a trigger operation on the visual guidance information.

20 Claims, 6 Drawing Sheets

(56) References Cited

U.S. PATENT DOCUMENTS

| | | | | |
|---|---|---|---|---|
| 11,240,108 | B1 * | 2/2022 | Davies | H04L 67/1097 |
| 11,533,397 | B1 * | 12/2022 | Hansen | H04L 12/1859 |
| 2005/0187913 | A1 * | 8/2005 | Nelken | G06F 16/245 |
| 2010/0029342 | A1 * | 2/2010 | Lee | H04M 1/651<br>455/567 |
| 2014/0258472 | A1 * | 9/2014 | Shirey | H04L 65/762<br>709/219 |
| 2019/0045053 | A1 * | 2/2019 | Desai | H04M 3/4285 |
| 2019/0146647 | A1 * | 5/2019 | Ramchandran | G06F 40/35<br>715/758 |
| 2022/0147770 | A1 * | 5/2022 | Jain | G06F 40/117 |

* cited by examiner

VISUAL INTERACTION METHOD AND DEVICE

CROSS-REFERENCES TO RELATED APPLICATION

This application claims priority to Chinese Patent Application No. 202111274623.4 filed on Oct. 29, 2021, the entire content of which is incorporated herein by reference.

FIELD OF TECHNOLOGY

The present disclosure relates to the technical field of communication technologies and, more specifically, to a visual interaction method and device

BACKGROUND

With the development of artificial intelligence technology, intelligent customer service systems have been widely used in various businesses, which is convenient for users to ask questions through text, call, or other communication methods to obtain the corresponding reply information and solve user problems online.

However, after the user uses a certain communication method to ask for information, the customer service system may be in a busy state, requiring the user to wait for a reply in the original communication state, which affects the service quality and impairs the user experience.

BRIEF SUMMARY OF THE DISCLOSURE

One aspect of the present disclosure provides a visual interaction method. The visual interaction method includes obtaining first input information; outputting visual guidance information for the first input information in response to a query request for the first input information, the visual guidance information being generated when the first input information is in a queuing state and is used to indicate a visual response mode of the query request; and outputting a visual response for the first input information based on the visual response mode in response to a trigger operation on the visual guidance information.

Another aspect of the present disclosure provides a visual interaction method. The visual interaction method includes receiving a query request for the first input information sent by a terminal; obtaining visual guidance information for the first input information in response to detecting the first input information being in a queuing state, the visual guidance information being used to indicate a visual response mode of the query request; sending the visual guidance information to the terminal; and feeding back a visual response for the first input information in response to receiving trigger information for the visual guidance information.

Another aspect of the present disclosure provides a visual interaction device. The device includes a first input information acquisition module for obtaining first input information; a visual guidance information module configured to output visual guidance information for the first input information in response to a query request for the first input information, the visual guidance information being generated when the first input information is in a queuing state and is used to indicate a visual response mode of the query request; and a visual response output module configured to output a visual response for the first input information based on the visual response mode in response to a trigger operation on the visual guidance information.

Another aspect of the present disclosure provides a visual interaction device. The device includes a query request receiving module configured to receive a query request for first input information sent by a client; a visual guidance information acquisition module configured to detect that the first input information is in a queuing state, and obtain visual guidance information for the first input information, the visual guidance information being used to indicate a visual response mode of the query request; a visual guidance information sending module configured to send the visual guidance information to the client; and a visual response feedback module configured to feed back the visual response for the first input information in response to receiving trigger information for the visual guidance information.

BRIEF DESCRIPTION OF THE DRAWINGS

To clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Hereinafter, aspects, features, and embodiments of the present disclosure will be described with reference to the accompanying drawings. It should be understood that such description is illustrative only but is not intended to limit the scope of the present disclosure. In addition, it will be understood by those skilled in the art that various modifications in form and details may be made therein without departing from the spirit and scope of the present disclosure.

Figure 1:
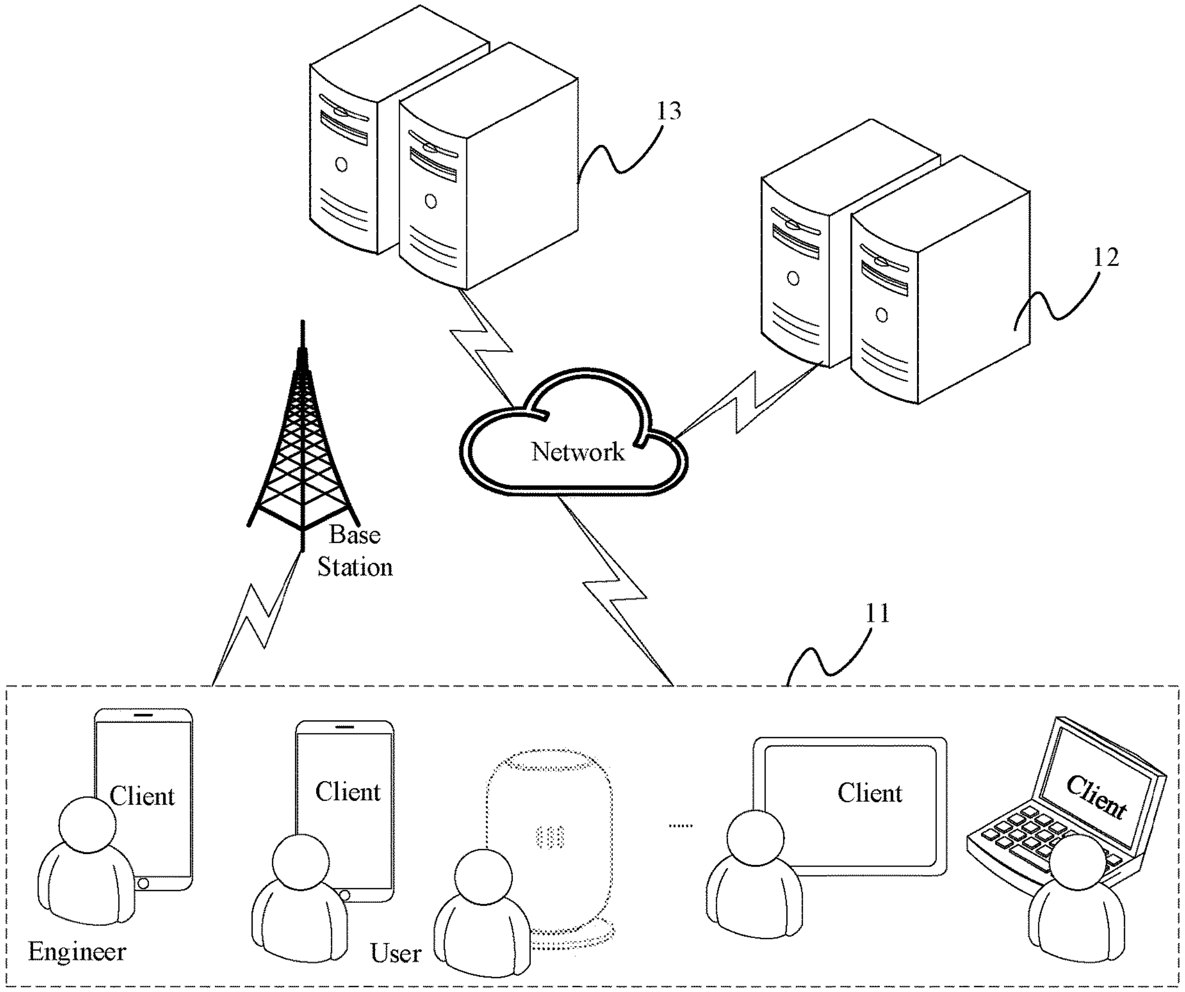
FIG. 1 is a system architecture diagram of an application environment suitable for a visual interaction method according to an embodiment of the present disclosure.

FIG. 1 is a system architecture diagram of an application environment suitable for a visual interaction method according to an embodiment of the present disclosure. The application environment may be customer service application scenarios or other question and answer (QA) application scenarios. As shown in FIG. 1, the system includes a terminal 11 and a service server 12.

The terminal 11 may include, but is not limited to, electronic devices, such as smart phones, tablets, wearable devices, netbooks, smart watches, augmented reality (AR) devices, virtual reality (VR) devices, vehicle-mounted devices, robots, desktop computers, and smart transportation devices. The type of terminal product can be determined based on the requirements of the application scenario, The terminal 11 may be configured to run a client that can access a QA application platform such as a customer service system, such that the user can access the QA application platform through the client to conduct product question consultation and request for the required response.

The terminal 11 may be a dedicated application matching the QA application platform, a small program (i.e., a sub-application) loaded by the QA application platform, a social application that implements access to the QA application platform, such as the official account created by the application platform, a communication application that supports communication methods such as phone calls and accesses the application platform through a specific communication account published by the application platform (such as calling the customer service line for product consultation, etc.), a web application that logs in to the QA application platform by entering a URL through a browser, etc. The present disclosure does not limit the application type of the client, which can be determined based on the communication method of the user accessing the QA application platform using the terminal 11, which is not described in detail in the embodiments of the present disclosure.

In the customer service scenario, if the user accesses the customer service application platform by calling the customer service phone number, the communication link of the call can be assigned to a customer service robot for answering. If the user chooses the manual service method, the communication link can be assigned to a service engineer who can answer the questions, and the communication connection between the user terminal and the service engineer terminal can be established, and the service engineer can answer the user's questions. If the service engineer is in a busy state, the user needs to stay on the call and wait, which reduces the user experience. In view of the foregoing, embodiments of the present disclosure provide a visual interaction method. The visual interaction method can be used to guide the user to select a visual response mode for the question raised by the user, and obtain a visual response without the need for the user to continue to wait, thereby enriching the interaction methods and improving the service quality. For the implementation process, reference can be made to the visual interaction method described on the terminal side below, which is not described in detail in the embodiments of the present disclosure.

The service server 12 may be a service device that supports service requests of a QA application platform such as a customer service system, an independent physical server, a server cluster composed of multiple physical servers, or a cloud server capable of implementing cloud computing services. The service server 12 may communicate with the terminal 11 through a wired communication network or a wireless communication network to meet application requirements.

In view of the foregoing, the terminal 11 can access the service server 12 through various communication methods such as logging into the customer service application platform through program loaded an application program of another application platform, an official account, etc. In this case, the system of the application environment may also include a corresponding communication server 13, such as a social server that supports the communication service business of the social application platform, etc. In this way, the query request sent by the terminal can be forwarded to the service server 12 through the communication server 13, which is not described in detail in the embodiments of the present disclosure. It should be understood that, for different communication methods, the system may configure a corresponding type of communication server to support the data transmission for a specific communication method. These communication methods will not be described in detail in the embodiments of the present disclosure.

In the embodiments of the present disclosure, after receiving the query request sent by the terminal through any communication method, the service server 12 may determine one or more questions to be answers by analyzing the first input information included in the query request. The first input information may be information from the content of one or more questions raised by the user. Subsequent, the service server 12 may allocate the query request to the corresponding reply object, such as an intelligent robot, a service engineer, etc., such as sending the query request or the processing task including the query request the task queue of the corresponding reply object, and waiting for the reply object to process the query request.

In this case, in order to reduce the user's wait time and improve the service quality, when the service server 12 determines that any query request is in a queuing state, that is, a waiting for reply state, the service server 12 may generate corresponding visual guidance information to feed back to the user terminal for output, and guide the user to select a visual response mode to obtain the reply information of the query, such as sending the user to the live room dedicated to address of the query request to watch live content containing the answer to the query request. The service server 12 may also obtain the answer to the query request through the recorded video file fed back by the service server to answer the question. In this way, there is no need for the user to wait in the communication state of sending the query request, and the interaction method of question and answer is enriched. For the implement process of the visual interaction method, reference can be made to the content of the method embodiments described on the service server side below, which will not be repeated in this embodiment.

It should be understood that the system applicable to the visual interaction method proposed in the present disclosure is not limited to the system structure shown in FIG. 1. In practical applications, the system may also include more devices or combined devices, such as data storage devices used to store questions sent by the user terminal, different forms of reply information for different questions, data storage devices for recoding historical information generated during the question and answer process, a telephone switch that supports telephone communication, and various network devices that support other network communications, etc.

Figure 2:
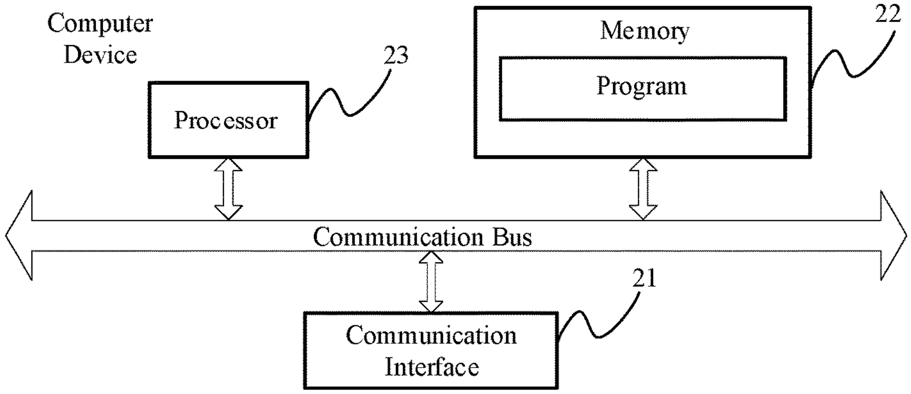
FIG. 2 is a schematic diagram of a hardware structure of a computer device suitable for the visual interaction method according to an embodiment of the present disclosure.

FIG. 2 is a schematic diagram of a hardware structure of a computer device suitable for the visual interaction method according to an embodiment of the present disclosure. The computer device may be a terminal or a service server. For the types and functions of the terminal and the service server, reference can be made to the descriptions in the corresponding part of the foregoing embodiments. As shown in FIG. 2, the computer device includes a communication interface 21, a memory 22, and a processor 23.

The number of each of the communication interface 21, the memory 22, and the processor 23 may be at least one, and the communication interface 21, the memory 22, and the processor 23 may communicate through a communication bus.

The communication interface 21 may be an interface of a wireless communication module and/or a wired communication module, such as an interface of a communication module such as a Wi-Fi module, a GPRS module, or a GSM module. The communication interface 21 may also include interfaces such as a USB interface, a serial/parallel port, etc., for realizing data interaction between the internal components of the computer device. The communication interface of the computer device can be configured based on the specific network requirements, which is not limited in the embodiments of the present disclosure.

The memory 22 may store a program for implementing the visual interaction method provided by the embodiments of the present disclosure. The processor 23 may be configured to load and execute the program stored in the memory 22 to implement the various processes of the visual interaction method on the corresponding side of the computer device provided by the embodiments of the present disclosure. For the implementation process, reference can be made to the description of the method embodiment on the side of the corresponding computer device below, which is not described in detail in this embodiment.

In some embodiments, the memory 22 may include a high-speed random-access memory, and may also include a non-volatile memory, such as at least one magnetic disk storage device, or other volatile solid state storage device. The processor 23 may be a central processing unit (CPU), an application-specific integrated circuit (ASIC), a digital signal processor (DSP), an off-the-shelf programmable gate array (FPGA), or other programmable logic devices, etc. The present disclosure does not limit the device type of the memory 22 and the processor 23 in the computer device, which can be determined based on the corresponding functional requirements of the computer device.

Figure 3:
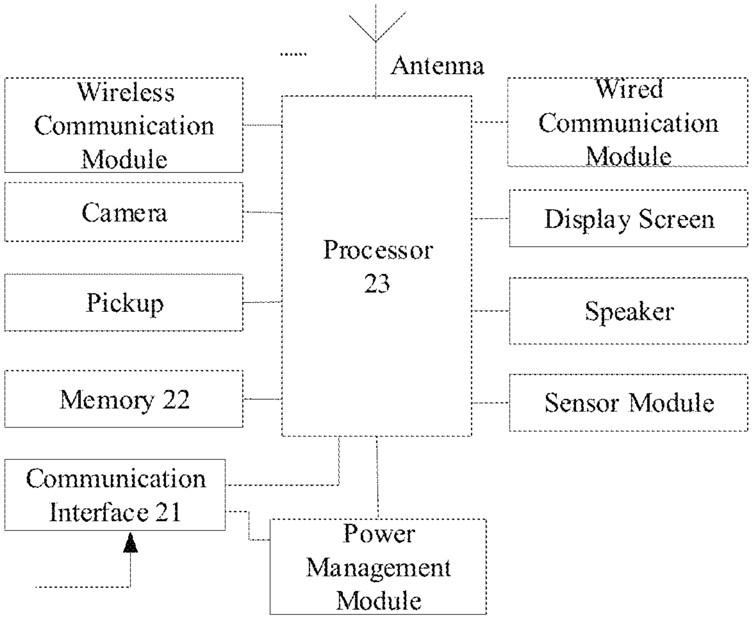
FIG. 3 is a schematic diagram of a hardware structure of the computer device suitable for the visual interaction method according to an embodiment of the present disclosure.

It should be understood that the structure of the computer device shown in FIG. 2 does not constitute a limitation on the computer device in the embodiments of the present disclosure. In practical applications, the computer device may include more components than those shown in FIG. 2, or combine certain components. For example, when the computer device is a terminal, the hardware structure of the computer device may be the schematic diagram shown in FIG. 3. In addition, the computer device may also include at least one input device such as a camera, a sound pickup, etc., at least one output device such as a display, a speaker, etc., a sensor module composed of various sensors, an antenna, a wired/wireless communication module, etc.

Figure 4:
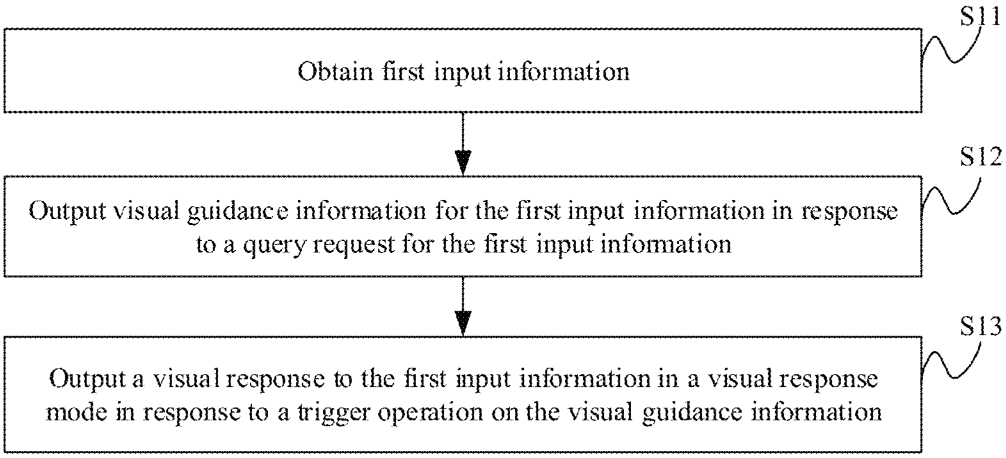
FIG. 4 is a flowchart of the visual interaction method implemented on a terminal side according to an embodiment of the present disclosure.

FIG. 4 is a flowchart of the visual interaction method according to an embodiment of the present disclosure. The method may be executed by a terminal. The method will be described in detail below.

11. obtaining first input information.

In view of the foregoing description, when a user needs to consult a certain product, the user may access the product's customer service system through communication methods such as phone calls, social applications, text messages, and customer service exclusive communication clients to request the corresponding responses. In this case, the user may start the corresponding client on the terminal and input the first input information including contents of one or more questions.

It should be understood that for the different communication methods listed above, when the terminal logs into the customer service system of the product, the output query interface may be different, and the form of the obtained first input information may also be different. For example, for consultation through telephone communication, the voice data of the input question content may be directly determined as the first input information, or the text content obtained by performing voice recognition on the voice data may be determined as the first input information, which is not limited in the embodiments of the present disclosure.

If the user logs into the customer service system through a social application, the user may enter the query interface of the customer service system through a small program (i.e., a sub-application) of the customer service system loaded through the social application, or an official account that the user follows. Subsequently, the user may input the content of the question through text, voice, video, etc. In this case, the first input information obtained by the terminal may correspond to the content of the question in the form corresponding to the input method. The present disclosure does not limit the information content of the first input information and the obtaining method thereof, which may include but is not limited to the implementation manners described above.

12. outputting visual guidance information for the first input information in response to the query request for the first input information.

In the customer service scenario, based on the communication method described above, after obtaining the first input information including the content of the question, the terminal may generate a query request including the first input information by clicking a send button. The terminal may send the query request to the service server of the customer service system through wired communication or wireless communication. If the terminal receives the question through an online voice method such as telephone, and obtains the first input information spoken by the user, the terminal may automatically generate a query request including the first input information. The communication network device of the telephone service to which the telephone communication belongs, such as a base station, may forward the query request to the service server. The specific implementation method of sending the query request is not limited in the embodiments of the present disclosure.

After the service server receives the query request, the service server may analyze the query request to determine the information content in the first input information, such as at least one question content, a consultation object (such as a product), etc. Subsequently, based on the information content, the service server may assign the processing task generated based on the query request to the reply object that has the ability to answer the question, such as the service engineer, robot, and other reply objects for the product for processing.

In practical applications, the query request (which may include the first input information) or the processing task including the query request described above is generally sent to the task queue of the corresponding reply object, waiting for the reply object to process. The pending processing state of an unprocessed query request or its processing task may be recorded as a queuing state, and the present disclosure does not limit the representation of the queuing state. It should be understood that reply object may extract the query request or its processing task for processing, delete the query request from the task queue, and update the status of the query request from the queuing state to the processing state, such that an administrator or other objects can query the state of the query request through its status.

For the query request or its processing task in the queuing state, prompt information such as "busy, please wait" can be fed back to the corresponding terminal to notify the user that the corresponding reply object is busy, and the user can continue to wait. In order to improve this situation, in the present disclosure, when it is determined that the first input information is in the queuing state, that is, the query request of the first input information has not been processed and the first input information is in the queuing state, in order to reduce the user's wait time, visual guidance information for the first input information can be generated to indicate the visual response mode of the query request.

It should be noted that the present disclosure does not limit the content of the visual guidance information and its output form, such as prompting the user whether to switch to the visual response mode, obtain the reply prompt information for the visual response to the first input information. The files, viewing addresses, etc. for one or more visual responses to the first input information may be determined based on the application requirements, which are not described in detail in this embodiment of the present disclosure.

13. outputting a visual response to the first input information in a visual response mode in response to a trigger operation on the visual guidance information.

Continue with the foregoing description, after seeing the visual guidance information for the first input information output by the terminal, the user may choose to continue waiting or switch to the visual response mode based on the actual situation of the individual to obtain a visual response to the first input information. If the user wishes to view the visual response, the user may perform a trigger operation on the currently displayed visual guidance information, such as triggering to determine the visual response mode to selected to obtain the visual response, or triggering the file or address link of the visual response that the user wishes to view, etc. The implementation method of the trigger operation may be determined based on the content of the visual guidance information.

In response to the trigger operation described above, the client in the terminal may generate a corresponding visual response instruction and send it to the service server. The service server may obtain one or more visual responses to the first input information, such as live broadcast information, recorded video files, address links of live broadcast/video files, etc., in response to the question included in the first input information. Subsequently, the obtained visual response may be fed back to the terminal, such that the terminal can output the received visual response based on the corresponding visual response mode.

For the implementation method for the service server to obtain the visual response to the first input information, reference can be made to the relevant description of the method embodiments on the service server below, which is not described in detail in this embodiment of the present disclosure. It should be understood that if the visual response is the address link of a video file, the user may click the address link to obtain and play the video file, and view the content of the answer to the question. In this case, the video file may be provided by the service server, or a video provided by other application platform forwarded by the service server. The present disclosure does not limit the acquisition method of the video file, which can be determined based on actual needs.

In the practical application of the present disclosure, the visual response to the first input information may be fed back and output by means of communication such as email, text message, and voice message. Therefore, the terminal may output the received visual response through the corresponding client, such as the dedicated service clients to the customer service system, various social clients, email addresses, and other communication clients. The present disclosure does not limit the implementation method of how the terminal outputs the visual response, which can be determined based on actual needs.

Consistent with the present disclosure, after the user uses the terminal to send a query request for the first input information to the service server through a fixed communication method (such as a phone call or a text message), when the service server determines that the first input information is in a queuing state and cannot answer the questions in the first input information raised by the user in time, visual guidance information for the first input information can be provided to the terminal to remind the user to use the visual response mode to get the answers to the questions. In this way, the user can trigger the output visual guidance information based on the actual situation, and the terminal can output the corresponding visual response based on the visual response mode to provide the answers to user's questions, Further, there is no need for the user to maintain and wait in the communication mode, which enriches the interactive mode of question-and-answer scenarios such as customer service. This visual response method can also answer user questions more clearly and accurately, especially for answers involving complex processing steps, thereby improving the service quality.

Figure 5:
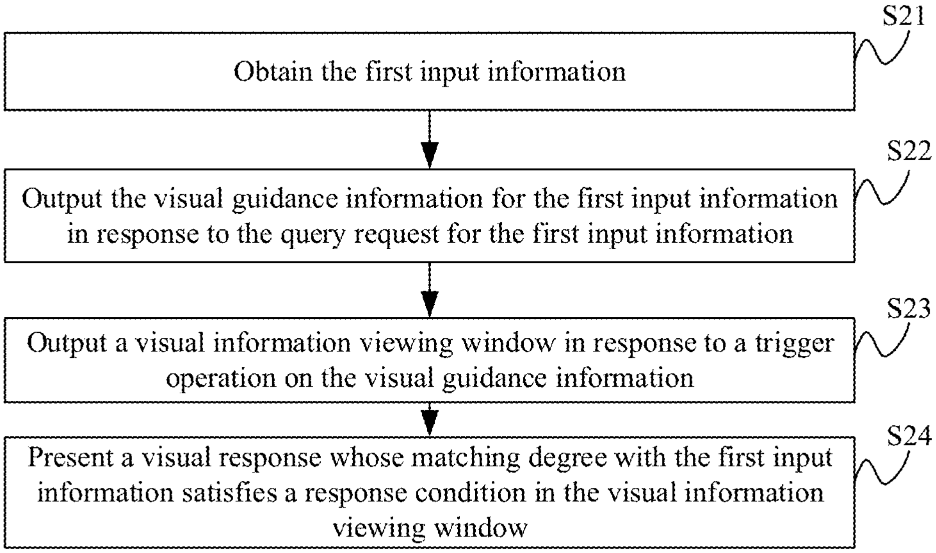
FIG. 5 is a flowchart of the visual interaction method implemented on the terminal side according to an embodiment of the present disclosure.

FIG. 5 is a flowchart of the visual interaction method implemented on the terminal side according to an embodiment of the present disclosure. This embodiment is an optional refinement implementation method of the visual interaction method described above, but the present disclosure is not limited to this refinement implementation method. Further, the method can still be executed by the terminal. The method will be described in detail below.

21. obtaining the first input information.

22. outputting the visual guidance information for the first input information in response to the query request for the first input information.

For the implementation process of the processes of 21 and 22, reference can be made to the descriptions of the corresponding parts of the foregoing embodiments, which will not be repeated here.

23. outputting a visual information viewing window in response to the trigger operation on the visual guidance information.

24. presenting a visual response whose matching degree with the first input information satisfies a response condition in the visual information viewing window.

In view of the relevant description of the visual guidance information in the foregoing embodiments, due to the limited number of reply objects such as service engineers and robots in the customer service system that can answer user questions, and each reply object can serve a limited number of users at the same time, users often encounter queuing in the process of product consultation with the customer service system through any communication method such as telephone, WeChat, text, etc., especially in the scenario of voice consultation with the service engineer. When the service engineer is busy, and the user's query request is added to the service engineer's task queue, the query request will be in the queuing state, waiting for the service engineer to be free to process the query request.

In order to reduce the user's wait time, the service server may be configured to detect that the first input information corresponding to the user's query request is in the queuing state, and check whether there are other ways to answer the user's question. In the embodiments of the present disclosure, it is possible to query whether there is visual response information that can answer the question. If there is visual response information that can answer the question, the corresponding visual guidance information can be generated to prompt the user to switch to the visual response mode, communicate with the service server, and obtain the visual response information of the question asked.

In this case, if the user decides to switch to the visual response mode to obtain the answer to the question based on the visual guidance information presented, the user may trigger the visual guidance information to output the visual information viewing window to display the visual response that matches the first input information and satisfies the response condition queried by the service server. The response condition can be determined based on actual needs, which are not limited in the embodiments of the present disclosure.

It should be understood that for a visual response with a high degree of matching with the first input information, the visual information content included in or corresponding to the visual response is more likely to answer the question included in the first input information. The present disclosure does not limit the method for obtaining the matching degree between different visual responses and the first input information, which may be combined with natural language processing, machine learning, deep learning, and other methods in artificial intelligence. A sematic analysis can be performed on the content of the visual information included in or corresponding to the visual response, and the content of the question included in the first input information. Subsequently, the probability that the obtain visual information content can answer the question can be determined as the matching degree between the corresponding visual response and the first input information, however, the present disclosure is not limited to this acquisition method.

In some embodiments, the visual response that satisfies the response condition described above may include, but is not limited to, the visual response with the highest matching degree with the first input information, at least one visual response whose matching degree with the first input information is greater than a first matching threshold, etc. The present disclosure does not limit the value of the first matching threshold, which can be determined based on the actual situation.

In the process of querying the visual response that matches with the first input information, that is, the visual information that can answer the question included in the first input information, the service server may directly obtain the visual response that is most likely to answer the user's question, that is, the visual response that matches the information content of the first input information with the highest degree, based on, but not limited to, the method described above. In this way, the user does not need to query the received visual response one by one to obtain the required answer content.

In other embodiments, for visual responses who matching degree with the first input information is greater than the first matching threshold may also answer the question included in the first input information. In this case, the service server may randomly select a visual response from the queried visual responses whose matching degree of the first input information is greater than the first matching threshold, and feed it back to the terminal for output.

For example, after the user sees the visual guidance information and does not wish to wait, the user may choose to switch to the visual response mode. The service server may feed the information of any live broadcast that is currently answering the question included in the first input information back to the terminal. The user may click to enter the corresponding live broadcast, the terminal may output the live broadcast content of the live broadcast, and the user may obtain the required response information by watching the live broadcast. Of course, the service server may also feed the address of a recorded broadcast file (such as a video file) that may answer the user's question back to the terminal. The user may click on the address to obtain the video file for playback to obtain the required response information.

In some embodiments, due to different user's ability to understand the answer to the same question, some users may solve the problem by watching a visual response, while some users may not understand the same visual response to solve the problem. Therefore, the visual response with the highest matching degree with the first input information may not necessarily be the most suitable response information for the user. In this case, the service server may directly feed the predicted visual responses that may answer the user's question to the user terminal for output, and the user may choose to view the visual response based on the personal situation to obtain the required answer content.

Therefore, as described above, the service server may send each visual response whose matching degree with the first input information is greater than the first matching threshold to the terminal. The first matching threshold may be a matching threshold indicating that the corresponding visual response includes or the corresponding visual information can answer the question included in the first input information, and the value of the matching threshold is not limited in the present disclosure. It should be understood that in different scenarios, for different first input information, the value of the corresponding first matching threshold when querying the matching visual response may be the same or different, thereby realizing a targeted query. Based on this, when there is a plurality of visual responses that meet the response condition, in response to a trigger operation on the visual guidance information, the terminal may output the visual information viewing window. In the visual information viewing window, the respective identification information of the plurality of visual responses whose matching degree with the first input information is greater than the first matching threshold may be displayed. Subsequently, the user may select any of the identification information to view the corresponding visual response. That is, in response to a selection trigger operation on the identification information, the terminal may present a visual response corresponding to the selected target identification information in the visual information viewing window.

For example, the service server may feed a list back to the terminal. The list may include the visual responses that may include the address of the live broadcast and the address of the video file that may include the answer tot eh question in the first input information. In this way, the user may select a visual response to view from the visual response list output by the terminal. For example, the user may click the address of a video file to enter the playback page of the video file to view the content of the video file. It should be noted that the present disclosure does not limit the manner in which the service server feeds back one or more visual responses to the terminal, which may include text messages, emails, and voices, depending on the situation.

In some embodiments, after outputting the visual information viewing window in response to the trigger operation on the visual guidance information, the terminal may display a visual response list in the visual information viewing window. The visual response list may include a list of live broadcasts and/or recorded video files, and one or more question labels corresponding to each visual response, such that the user may use the displayed question label to determine what question the corresponding visual response is for. In this way, the user may select the visual response corresponding to the question of interest or the targeted question accordingly, such as clicking on the visual response, entering the corresponding live broadcast to watch the live broadcast, or entering the playback page of the recorded video file to watch the video content, which is not limited in the embodiments of the present disclosure.

In some embodiments, after the user determines the visual response to view and enters the playback page of the visual information, such as the live broadcast page of the live broadcast or the video playback page of the vide file, etc., preset promotional information for the service application platform, such as company or product information, may be played. In some cases, the service application platform may also playback the visual responses of hot issues consulted by users.

In this case, the service server may count the historical questions included in the historical query request sent by the user terminal (that is, the content included in the first input information), and the number of occurrences within a preset period of time, that is, obtain the statistics on the frequency of each historical question, and identify historical questions with a frequency greater than a threshold value as hot issues, and obtain the visual responses corresponding to each hot issue. After receiving the trigger operation on the visual guidance information sent by the terminal, the service server may push the hot visual responses to the terminal for the terminal to display the hot visual responses in the visual information viewing window, thereby realizing the promotion of the corresponding service.

In some embodiments, in the case that the visual guidance information obtained by the terminal includes a visual response or its identification information that matches the first input information, the terminal may output the visual information viewing window, and the visual response corresponding to the triggered visual guidance information may be directly presented in the visual information viewing window. For example, the visual guidance information may include one or more addresses of visual response information. When the user selects the visual response mode, the user may select the address of a visual response information from the output visual guidance information, and access the visual response information corresponding to the address. The visual response information, such as a video, live broadcast content, text information, etc., may be presented in the output visual information viewing window.

Take the visual response as the live broadcast information (such as the address or identification of the live broadcast) as an example. In response to the query request for the first input information, the first live broadcast room information for the first input information and in a live broadcast state may be output (which may include information such as addresses of live broadcasts whose matching degree of one or more live broadcast contents and the first input information is greater than the first matching threshold). The user may choose whether to enter the live broadcast to watch based on actual needs. In response to the trigger operation on the information of the first live broadcast, the terminal may output the triggered live broadcast content of the first live broadcast. At this time, the live broadcast content may include a response to the first input information to answer the user's question. Of course, if the triggered live broadcast content of the first live broadcast cannot answer the user's question, the user may switch to other live broadcasts. For the implementation process, reference can be made to the descriptions in the corresponding parts of the following embodiments, which are not described in detail in this embodiment.

Figure 6:
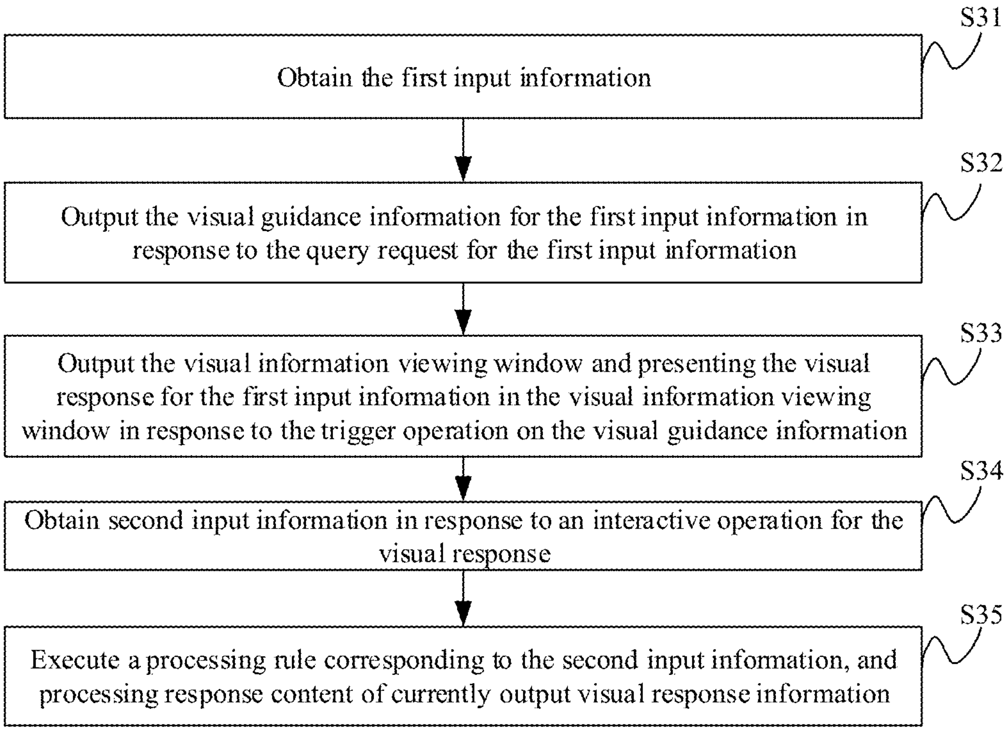
FIG. 6 is a flowchart of the visual interaction method implemented on the terminal side according to an embodiment of the present disclosure.

FIG. 6 is a flowchart of the visual interaction method according to an embodiment of the present disclosure. Based on the visual interaction method described in the foregoing embodiments, the user may perform interactive operations on the output visual response, including, but not limited to, the interaction implementation method described in this embodiment. Further, the method can still be executed by the terminal. The method will be described in detail below.

31. obtaining the first input information.

32. outputting the visual guidance information for the first input information in response to the query request for the first input information.

33. outputting the visual information viewing window and presenting the visual response for the first input information in the visual information viewing window in response to the trigger operation on the visual guidance information.

For the implementation process of the processes of 31, 32, and 33, reference can be made to the descriptions of the corresponding parts of the foregoing embodiments, which will not be repeated here.

34. obtaining second input information in response to an interactive operation for the visual response.

35. executing a processing rule corresponding to the second input information, and processing response content of currently output visual response information.

The embodiments of the present disclosure may follow, but are not limited to, the methods described in the foregoing embodiments. When the currently viewed visual response is determined, the corresponding visual response information content may be displayed in the visual information viewing window. In the process of viewing the content, the user may interact with the content, such as inputting corresponding interactive operations through a corresponding interface presented in the visual information viewing window, based on the actual situation to update the content of the visual response information presented in the visual information viewing window. The present disclosure does not limit the interactive method of the visual response, which can be flexibly configured based on the application requirements.

Figure 7:
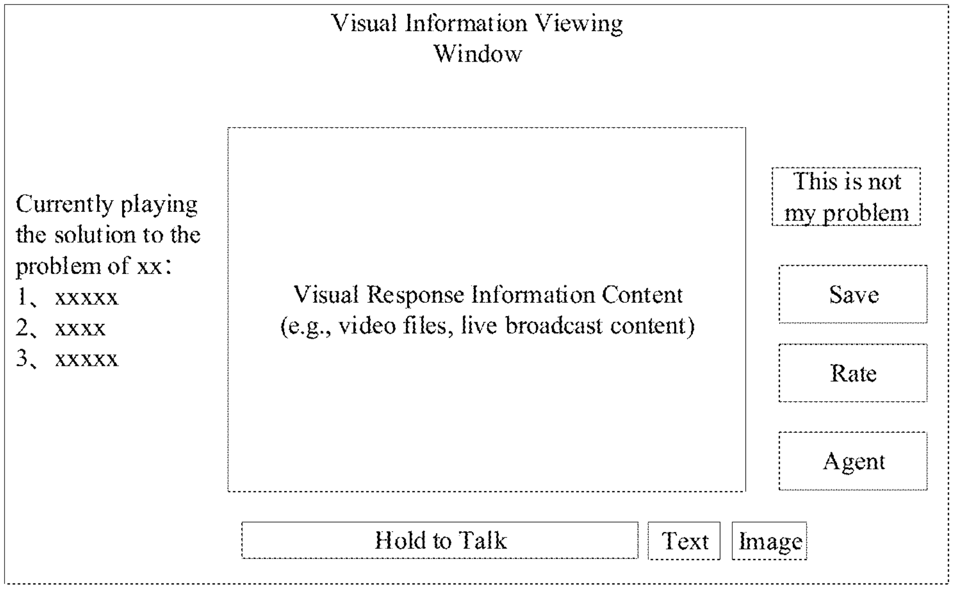
FIG. 7 is a schematic diagram of a page of a visual information viewing window in the visual interaction method implemented on the terminal side according to an embodiment of the present disclosure.

Refer to FIG. 7, which is a schematic diagram of a page of the visual information viewing window. The visual information viewing window may include one or more of an interface for adjusting the response content of the presented visual response (such as any one or more interactive buttons such as the voice interface (the "press-and-hold to talk" button), the text interface (the "text" button), or the image interface (the "image" button) shown in FIG. 7), a saving reply interface (the "save" button shown in FIG. 7), a rating response content interface (the "rate" button shown in FIG. 7), a switching specified service type interface (the "agent" button shown in FIG. 7), a visual response switching interface (the "This is not my problem" button shown in FIG. 7), etc. The present disclosure does not limit the interface included in the visual information viewing window and its output form, which may include, but is not limited to the content shown in FIG. 7.

The second input information may be an interactive instruction for the presented visual response obtained by the user clicking on any interface (i.e., the interactive information on the response content). The interactive instruction may include or represent the interactive method corresponding to the interface. The present disclosure does not limit the content and form of the interactive instruction, which can be set based on actual needs.

In conjunction with the interactive scene shown in FIG. 7, the process at 35 may include the following implementation method.

If the terminal responds to the trigger operation on the interface for adjusting the response content and obtains the response content adjustment information, such as voice data, test information, or image information, etc. that may be used to instruct the adjustment and presentation of the information content of the visual response. The terminal may send the response content adjustment information to the service server, and the service server may adjust the information based on the response content, obtain the adjusted visual response information, and send the adjusted visual response information back to the terminal. In this way, the terminal may present the adjusted visual response information in the visual information viewing window based on the response content adjustment information.

Take the visual response displayed in the visual information viewing window as a video file as an example. During the playback of the video file, the user may ask questions about the playback video content through voice, text, image, etc., that is, to obtain the second input information. Subsequently, the service server may update the video content of the video file played by the terminal based on the second input information.

In some embodiments, for the video content being played, the user may also control the video content by pausing the playback or jumping to a specific position (such as a specific time) of the video file to start playing the video content (such as controlling the video content to move forward, backward, replay, etc.), to meet the user's selective viewing of the desired video content by triggering the corresponding interactive button.

In some embodiments, if the terminal responds to the trigger operation on the save response content interface, the terminal may obtain the to-be-saved identification information of the currently output visual response, and record the to-be-saved identification information. In some embodiments, the to-be-saved identification information may be used to indicate the method to obtain the currently output visual response, such as the address of the visual response. Based on this, when the user watches the presented visual response information content, such as live broadcast or a recorded video, if the user is interested in the information content of the visual response and wishes to save it for subsequent viewing, the user may click the "save" button to save the address or file of the information content of the visual response. The present disclosure does not limit the implementation of saving the visual response.

In some embodiments, the to-be-saved identification information may be pushed to the user terminal through text messages, emails, content links, etc. The implementation method of saving the response content may include, but is not limited to, clicking the save button described above. In addition, the implementation method of saving the response content may also include the response content adjustment interaction method described above, in which a response content save instruction can be sent to the service server through voice, text, etc. In response to the response content save instruction, the service server may feed the corresponding to-be-saved identification information to the user terminal in the manner described above.

In some embodiments, if the user wants to rate the presented visual response, the service application platform providing the visual response may update the visual response or improve the function of the corresponding product based on the rating information provided by the user. Therefore, as shown in FIG. 7, the user may click the "rate" button to cause the terminal to respond to the response content rating trigger operation, and output the response content rating window. In response to the rating input operation on the response content rating window, the rating information for the response content is obtained and sent to the service server. The service server may store in rating information in a database, such that statistics can be retrieved based on the application requirements. The present disclosure does not limit the storage method of the rating information and its subsequent application, which can be determined based on actual needs.

In some embodiments, similar to the implementation method for the visual response information content saving interaction described above, the corresponding response information rating instructions for the rating interaction may also be sent to the service server through voice, text, etc. Subsequently, the rating of the information content of the presented visual response may be implemented based on the method described, and the implementation process will not be repeated here.

In some embodiments, the content of the visual response presented to the user through the visual information viewing window may not be the question currently posted by the user, that is, the question included in the first input information. In this case, the user may perform a switching interactive operation on the presented visual response, obtain the corresponding sliding switching instruction, voice switching instruction, text switching instruction, or click the switching instruction generated by clicking the "This is not my problem" button, and send the instruction to the service server. The service server may response to the switching instruction, obtain the visual response for the first input information again based on the preset rules, and display the visual response in the visual information viewing window of the terminal. For the acquisition process of the visual response, reference can be made to the descriptions of the corresponding parts of the foregoing embodiments which will not be repeated here.

In some embodiments, when the user is consulting the customer service by phone, WeChat, text, etc., and the service engineer is busy and cannot respond immediately, the user may be guided to choose the visual response method described above, and watch the visual response to the requestion in the first input information. Subsequently, the user may interact in the manner described above. In this process, if it is determined that the first input information is switched from the queueing state to the processing state, indicating the service engineer is available to answer the user's question, the display state of the "agent" button output in the visual information viewing window of the user terminal may be updated. That is, the display state of the interface of the specified service type may be updated, such as updating from the gray background to a first color background, etc. Based on the change of the display state, the user can be informed that the service engineer is available to answer the question, and can choose to switch to the agent service mode for consultation.

It should be noted that the present disclosure does not limit the implementation method for updating the display state of the interface of the specified service type. The display state may include, but is not limited to, the background color of the interface of the specified service type, and the interface of the specified service type is not limited to the agent service button, which can be flexibly configured based on actual needs.

Based on the foregoing description, when the user knows that the service engineer is available to answer the question through the method described above, that is, the user's original queue is idle or the queue is waiting for the first input information, the user may click the "agent" button to switch to the manual service response page, that is, the query page for obtaining the first input information. In this way, the user terminal may switch to the communication link with the terminal of the service engineer, and obtain the response information for the first input information provided by the service engineer. That is, in response to the specified service type switching instruction, the user terminal may jump to the specified service response page and obtain the response information for the first input information.

In some embodiments, the service engineer may also actively send a reply call request to the user terminal based on the first input information in the task queue. The user may select this communication method to obtain a response to the question, and confirm the reply. The terminal may respond to the reply operation for the reply call request, establish a communication connection with the service engineer client, and obtain the response information for the first input information.

It should be noted that in the application scenario of the visual information viewing window shown in FIG. 7, the user may also choose to switch to other visual response methods for the first input information, which can be different from the agent service method described above. The specified service type switching instructions described above may also include a switching instruction for the query interface of the customer service system based on the social application platform, which can be realized by configuring the corresponding interface in the visual information viewing window, Alternatively, the specified service type switching instruction may be input through voice, text, etc. The implementation process is similar to the implementation process of the agent service switching instruction described above, and will not be repeated here.

In some embodiments, in the process of presenting the visual response information content in the visual information viewing window, the text operation processes of the solution may also be displayed synchronously, such as the text information shown on the left side of the visual information viewing window in FIG. 7. In this case, the terminal of service server may perform semantic analysis on the information content of the visual response to obtain the corresponding response text information. Subsequently, based on a preset synchronous display template, the response text information and the information content of the visual response can be synchronously sent to the terminal, and the terminal can synchronously display the visual response and the response text information.

Figure 8:
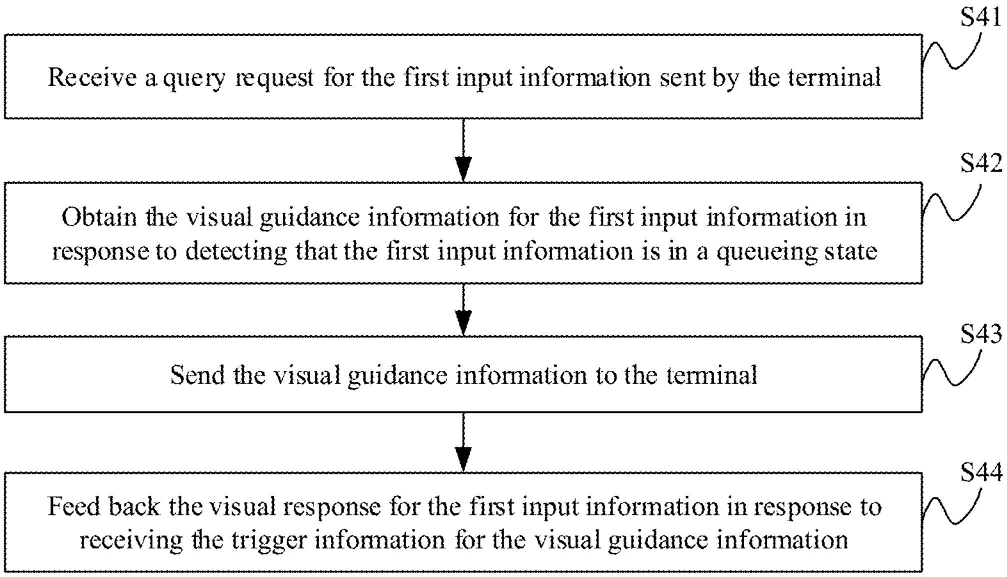
FIG. 8 is a flowchart of the visual interaction method implemented on a service server side according to an embodiment of the present disclosure.

FIG. 8 is a flowchart of the visual interaction method according to an embodiment of the present disclosure. The method may be executed by the service server. In practical applications, the service server may interact with the user terminal to implement the visual response method provided by the embodiments of the present disclosure. For the interaction processes, reference can be made to the descriptions of the corresponding parts of the foregoing embodiments, which will not be repeated here. The method will be described in detail below.

41. receiving a query request for the first input information sent by the terminal.

42. obtaining the visual guidance information for the first input information in response to detecting that the first input information is in a queueing state.

In some embodiments, the visual guidance information may be used to indicate a visual response to the query request. For the acquisition process and content of the visual guidance information, reference can be made to the descriptions of the corresponding parts of the foregoing embodiments, which will not be repeated here.

43. sending the visual guidance information to the terminal.

44. feeding the visual response for the first input information back in response to receiving the trigger information for the visual guidance information.

Figure 9:
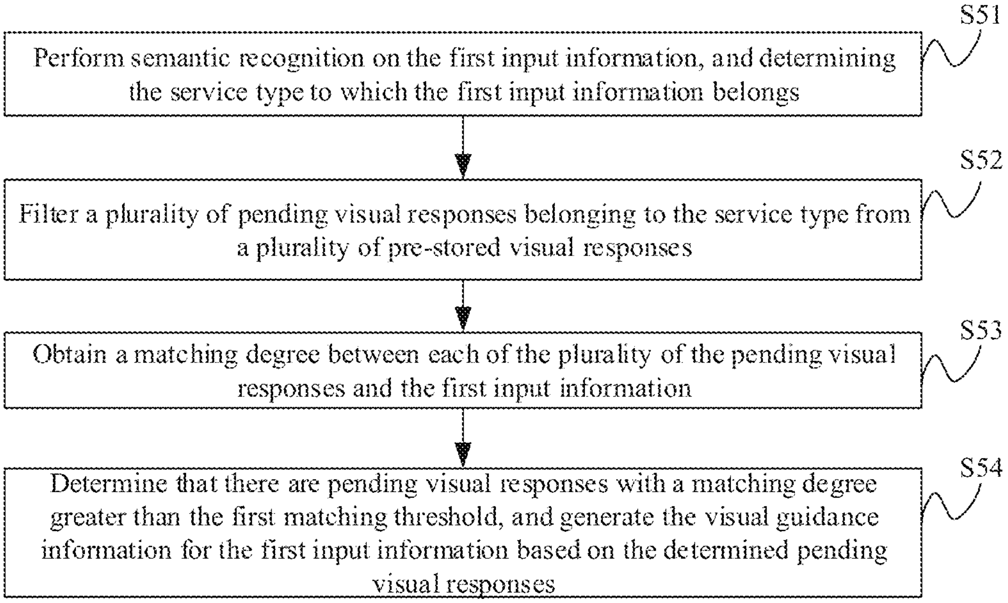
FIG. 9 is a flowchart of the visual interaction method implemented on the service server side according to an embodiment of the present disclosure.

In some embodiments, the visual guidance information for the first input information may be obtained through the method shown in FIG. 9. The method will be described in detail below.

51. performing semantic recognition on the first input information, and determining the service type to which the first input information belongs.

52. filtering a plurality of pending visual responses belonging to the service type from a plurality of pre-stored visual responses.

53. obtaining the matching degree between each of the plurality of the pending visual responses and the first input information.

54. determining that there are pending visual responses with a matching degree greater than the first matching threshold, and generating the visual guidance information for the first input information based on the determined pending visual responses.

In some embodiments, the service server may be configured to classify the services provided by the service application. For different service types, the service server may count the specific question with relatively high frequency, and obtain one or more visual response information content for each specific question, that is, the recorded videos that answer specific questions. Alternatively, the service server may assign process tasks for answering specific questions to service engineers, and create the corresponding live broadcasts for the service engineering team to answer specific questions. The service server may also record the addresses of the live broadcasts and the associated question identifiers, and determine the relationship between the visual responses and associated the service type, which is not limited to the implementation method of pre-establishing the visual responses of different service types described in this embodiment.

In this way, after obtaining the query request for the first input information sent by the terminal, the service server may, in the manner described above, filter the visual responses that may answer the user's question from the preset visual responses corresponding to the associated service type, that is, the pending visual responses whose matching degree is greater than the first matching threshold. The service server may then feed the visual responses to the user terminal through text messages, emails, voice, or other communication methods. Subsequently, the information content of the visual responses may be viewed on the terminal using the method described above, and the user may interact with the presented visual response information as needed.

It should be understood that in the interactive implementation method described in the foregoing embodiments, the service server may respond to the corresponding interaction instruction sent by the terminal, and process the instruction based on the corresponding processing rules to meet the corresponding interaction requirements, and the implementation process is not limited in the present disclosure.

Figure 10:
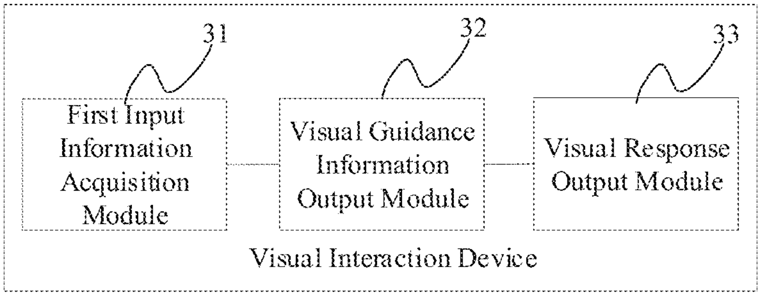
FIG. 10 is a schematic structural diagram of a visual interaction device according to an embodiment of the present disclosure.

FIG. 10 is a schematic structural diagram of a visual interaction device according to an embodiment of the present disclosure. This embodiment is described from the terminal side. As shown in FIG. 10, the visual interaction device includes a first input information acquisition module 31 configured to obtain the first input information; a visual guidance information output module 32 configured to output the visual guidance information for the first input information in response to a query request for the first input information; and a visual response output module 33 configured to output a visual response for the first input information based on the visual response mode in response to the trigger operation on the visual guidance information.

In some embodiments, the visual guidance information may be generated when the first input information is in a queuing state, and the visual guidance information may be used to indicate a visual response mode of the query request.

In some embodiments, the visual guidance information output module 32 may include a first presentation unit configured to present a visual response corresponding to the triggered visual guidance information in the visual information viewing window; or a second presentation unit configured to present a visual response whose matching degree with the first input information satisfies the response condition in the visual information viewing window.

In some embodiments, the second presentation unit may include one or more of a first acquisition unit, configured to obtain the visual response with the highest matching degree with the first input information; or a second acquisition unit, configured to obtain one or more visual responses whose matching degree with the first input information is greater than the first matching degree.

In some embodiments, if the number of visual responses obtained by the second acquisition unit is more than one, the visual response output module 33 may include a visual response list window output unit and a visual response selection presentation unit. The visual response list window output unit may be configured to output a visual response list window, and the respective identification information of the plurality of visual responses whose matching degree with the first input information is greater than the first matching threshold may be displayed in the visual response list window. The visual response selection presentation unit may be configured to display the visual response corresponding to the selected target identification information in the visual information viewing window in response to a selection of the identification information.

Figure 11:
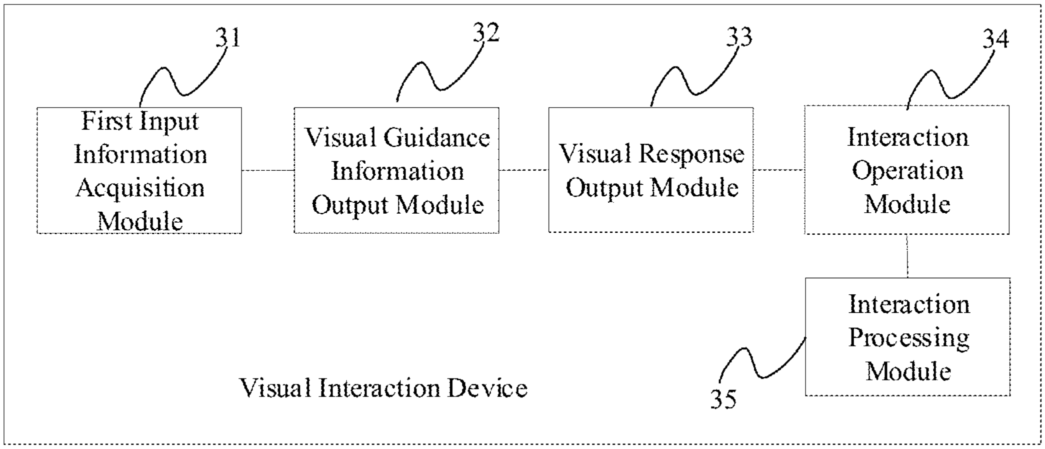
FIG. 11 is a schematic structural diagram of the visual interaction device according to an embodiment of the present disclosure.

In some embodiments, as shown in FIG. 11, the visual interaction device further includes an interaction operation module 34 configured to obtain the second input information in response to an interactive operation for the visual response; and an interaction processing module 35 configured to execute the processing rule corresponding to the second input information, and process the response content of the currently output visual response information.

In some embodiments, the visual information viewing window may include one or more interfaces among the response content adjustment interface, the save response content interface, the response content rating interface, the specified service type switching interface, and the visual response switching interface for the presented visual response.

In some embodiments, the interaction operation module 34 may include an interaction instruction acquisition unit, configured for obtaining an interactive instruction for the presented visual response in response to a trigger operation on any interface.

In some embodiments, the interaction processing module 35 may include an interaction processing unit configured to execute the interaction processing rule corresponding to the interactive instruction, and process the response content of the currently outputted visual response.

In some embodiments, the visual guidance information output module 32 may include a live broadcast room information output unit configured to output the first live broadcast room information for the first input information and in a live broadcast state. Correspondingly, the visual response output module 33 may include a live broadcast content output unit, configured to output the triggered live broadcast content of the first live broadcast in response to a trigger operation on the first live broadcast room information. The live broadcast content may include a response to the first input information.

Figure 12:
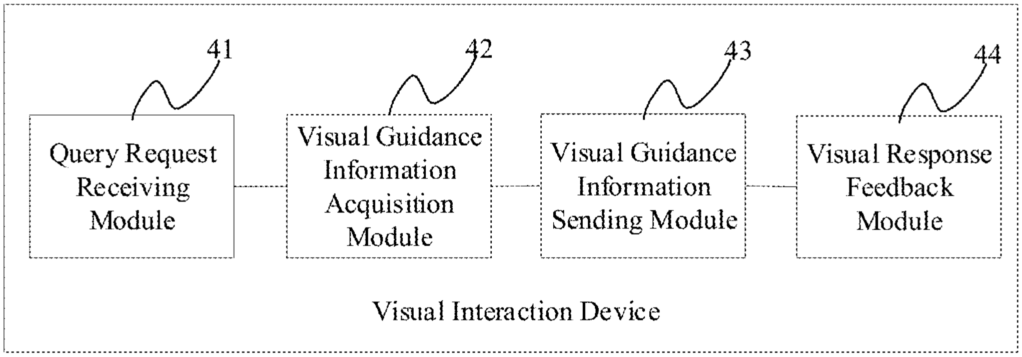
FIG. 12 is a schematic structural diagram of the visual interaction device according to an embodiment of the present disclosure.

FIG. 12 is a schematic structural diagram of the visual interaction device according to an embodiment of the present disclosure. This embodiment is described from the service server side. As shown in FIG. 12, the visual interaction device includes a query request receiving module 41 configured to receive a query request for the first input information sent by the client; a visual guidance information acquisition module 42 configured to detect that the first input information is in a queuing state, and obtain the visual guidance information for the first input information, the visual guidance information may be used to indicate a visual response mode of the query request; a visual guidance information sending module 43 configured to send the visual guidance information to the client; a visual response feedback module 44 configured to feed back the visual response to the first input information in response to receiving the trigger information for the visual response information.

In some embodiments, the visual guidance information acquisition module 42 may include a service type determination unit configured to perform semantic recognition on the first input information, and determine the service type to which the first input information belongs; a pending visual response filtering unit configured to filter a plurality of pending visual responses belonging to the service type from a plurality of pre-stored visual responses; a matching unit configured to obtain the matching degree between each of the plurality of pending visual responses and the first input information; and a visual guidance information generating unit configured to determined that there is a pending visual response with the matching degree greater than a first matching threshold, and generate the visual guidance information for the first input information based on the determined pending visual response.

Various modules and units in the device consistent with the above-described embodiments can all be stored in the memory of the corresponding computer device side (such as a terminal or a service server) as program modules. The processor of the computer device can execute the program modules stored in the memory to realize the corresponding functions on the computer device side. For the functions implemented and technical effects achieved by each program module and combinations, reference may be made to the description of the corresponding part of the method consistent with the embodiments, which are not repeated herewith.

A storage medium storing a computer program is provided in the disclosure. The computer program can be called and loaded by a processor to implement each process of the visual response interaction method described in the foregoing embodiments.

Unless otherwise defined, the terms "a," "an," and/or "the" do not specifically refer to the singular but may also include the plural. The terms "include" only suggest that the processes and elements that have been clearly identified are included, and these processes and elements do not constitute an exclusive list, and the method or device may also include other processes or elements. The element defined by the phrase "including a . . . " does not exclude the existence of other identical elements in the process, method, commodity, or equipment that includes the element.

Unless otherwise defined, "/" refers to or, for example, AB refers to A or B. "and/or" is only a description of association relationship of related objects indicating that there can be three kinds of relationships. For example, A and/or B, which can indicate A alone exists, A and B exist at the same time, and B exists alone. In addition, the term "a plurality of" refers two or more than two. The terms "first" and "second" are only used for descriptive purposes and cannot be understood as indicating or implying relative importance or implicitly indicating the number of indicated technical features. Thus, the features defined with "first" and "second" may explicitly or implicitly include one or more of these features.

The present disclosure is described according to the flowchart and/or block diagram of the method, terminal device (system), and computer program product of the present disclosure. Each process and/or block in the flowchart and/or block diagram, and the combination of processes and/or blocks in the flowchart and/or block diagram may be realized by computer program instructions. These computer program instructions may be provided to the processors of a general-purpose computer, a special-purpose computer, an embedded processor, or another programmable data processing terminal equipment to generate a machine, so that the instructions executed by the processor of the computer or another programmable data processing terminal equipment to generate a device configured to realize the functions specified in one or more processes in the flowchart and/or one or more blocks in the block diagram.

The various embodiments in the present specification are described in a progressive manner, and each embodiment focuses on differences from other embodiments, and the same similar parts between the various embodiments can be referred to each other.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A visual interaction method comprising:

obtaining first input information;

performing semantic recognition on the first input information to determine a service type to which the first input information belongs;

outputting visual guidance information for the first input information in response to a query request for the first input information, the visual guidance information being generated when the first input information is in a queuing state and is used to indicate a visual response mode of the query request;

outputting a visual response for the first input information based on the visual response mode in response to a trigger operation on the visual guidance information, including:

outputting a visual information viewing window and presenting the visual response in the visual information viewing window, and synchronously displaying, in the visual information viewing window and according to a preset synchronous display template, response text information obtained by semantic analysis of information content of the visual response, the response text information comprising text operation steps of a solution associated with the first input information, wherein the visual information viewing window includes a response content save interface and a specified service type switching interface, and in response to a trigger operation on the response content save interface, to-be-saved identification information of the visual response including an address of the visual response is obtained;

updating a display state of the specified service type switching interface in response to the first input information switching from the queuing state to a processing state; and outputting a service response page in response to a switch trigger operation on the specified service type switching interface when the first input information is in the processing state, the service response page being associated with a communication link to a live agent corresponding to the first input information, the live agent being selected from a team corresponding to the service type determined from the first input information by the semantic recognition.

2. The method of claim 1, wherein the visual response satisfies a response condition.

3. The method of claim 2, further comprising:

obtaining one or more visual responses satisfying the response condition, wherein the one or more visual responses satisfying the response condition include: the one or more visual responses have a matching degree with the first input information greater than a first matching threshold; and in response to a plurality of visual responses satisfying the response condition being obtained, outputting the visual response for the first input information includes:

outputting a visual response list window, and presenting respective identification information of the plurality of visual responses in the visual information viewing window; and in response to a selection trigger operation on identification information of one of the plurality of visual responses, presenting the one of the plurality of visual responses in the visual information viewing window.

4. The method of claim 2, further comprising:

obtaining second input information in response to an interactive operation for the visual response; and executing a processing rule corresponding to the second input information, and processing a response content of the currently output visual response.

5. The method of claim 4, wherein:

obtaining the second input information in response to the interactive operation for the visual response includes: obtaining an interactive instruction for the presented visual response in response to a trigger operation on any of the interfaces.

6. The method of claim 2, wherein the visual response satisfying the response condition includes the visual response having a highest matching degree with the first input information among a plurality of pending visual responses.

7. The method of claim 2, further comprising:

receiving one or more hot visual responses corresponding to one or more hot issues, respectively, and displaying the one or more hot visual responses, wherein an issue having a number of occurrences within a preset period of time greater than a threshold value is determined as the one or more hot issues.

8. The method of claim 1, wherein outputting the visual guidance information for the first input information includes:

outputting first live broadcast room information of a first live broadcast room that is in a live state; and outputting the visual response for the first input information in response to the trigger operation on the visual guidance information includes:

in response to a trigger operation on the first live broadcast room information, outputting a triggered live broadcast content of the first live broadcast room, the live broadcast content including a response to the first input information.

9. The method of claim 1, further comprising:

changing a background color of the visual information viewing window to indicate a change of available service types for the query request.

10. The method of claim 1, wherein the to-be-saved identification information is pushed to the terminal through at least one of a text message, an email, or a content link.

11. A visual interaction method comprising:

receiving a query request for first input information sent by a terminal;

performing semantic recognition on the first input information to determine a service type to which the first input information belongs;

obtaining visual guidance information for the first input information in response to detecting the first input information being in a queuing state, the visual guidance information being used to indicate a visual response mode of the query request;

sending the visual guidance information to the terminal;

feeding back a visual response for the first input information in response to receiving trigger information for the visual guidance information, wherein the visual response is presented in a visual information viewing window, the visual information viewing window including a response content save interface and a specified service type switching interface, and response text information obtained by semantic analysis of information content of the visual response is further sent to be synchronously displayed in the visual information viewing window according to a preset synchronous display template, the response text information comprising text operation steps of a solution associated with the first input information, wherein a display state of the specified service type switching interface is updated in response to the first input information switching from the queuing state to a processing state; and feeding back a service response page in response to receiving switch trigger information for specified service type switching when the first input information is in the processing state, the service response page being associated with a communication link to a live agent corresponding to the first input information, the live agent being selected from a team corresponding to the service type determined from the first input information by the semantic recognition.

12. The method of claim 11, wherein obtaining the visual guidance information for the first input information includes:

filtering a plurality of pending visual responses belonging to the service type from a plurality of pre-stored visual responses;

obtaining a matching degree between each of the plurality of pending visual responses and the first input information; and determining that there are pending visual responses with the matching degree greater than a first matching threshold, and generating the visual guidance information for the first input information based on the determined pending visual responses.

13. A visual interaction device, comprising:

one or more processors; and a memory communicating with the one or more processor and being configured to store a program, wherein when implementing the program, the one or more processors are configured to:

obtain first input information;

perform semantic recognition on the first input information to determine a service type to which the first input information belongs;

output visual guidance information for the first input information in response to a query request for the first input information, the visual guidance information being generated when the first input information is in a queuing state and is used to indicate a visual response mode of the query request; and output a visual response for the first input information based on the visual response mode in response to a trigger operation on the visual guidance information, wherein outputting the visual response includes outputting a visual information viewing window, presenting the visual response in the visual information viewing window, and synchronously displaying, in the visual information viewing window and according to a preset synchronous display template, response text information obtained by semantic analysis of information content of the visual response, the response text information comprising text operation steps of a solution associated with the first input information, the visual information viewing window including a response content save interface and a specified service type switching interface configured, in response to a trigger on the response content save interface, to obtain to-be-saved identification information of the visual response including an address of the visual response;

update a display state of the specified service type switching interface in response to the first input information switching from the queuing state to a processing state; and output a service response page in response to a switch trigger operation on the specified service type switching interface when the first input information is in the processing state, the service response page being associated with a communication link to a live agent corresponding to the first input information, the live agent being selected from a team corresponding to the service type determined from the first input information by the semantic recognition.

14. The device of claim 13, wherein the visual response satisfies a response condition.

15. The device of claim 14, wherein the one or more processors are further configured to:

obtain one or more visual responses satisfying the response condition wherein the one or more visual responses satisfying the response condition include the one or more visual responses having a matching degree with the first input information greater than a first matching threshold.

16. The device of claim 15, wherein the one or more processors are further configured to, in response to a plurality of visual responses satisfying the response condition being obtained:

output a visual response list window and respective identification information of the plurality of visual responses in the visual information viewing window; and in response to a selection trigger operation on identification information of one of the plurality of visual responses, present the one of the plurality of visual responses.

17. The device of claim 14, wherein the one or more processors are further configured to:

obtain second input information in response to an interactive operation for the visual response; and execute a processing rule corresponding to the second input information, and process a response content of the currently output visual response.

18. The device of claim 13, wherein the one or more processors are further configured to:

obtain an interactive instruction for the presented visual response in response to a trigger operation on any of the interfaces.

19. The device of claim 13, wherein the one or more processors are further configured to:

output first live broadcast room information of a first live broadcast room that is in a live state; and in response to a trigger operation on the first live broadcast room information, output a triggered live broadcast content of the first live broadcast room, the live broadcast content including a response to the first input information.

20. The device of claim 13, wherein:

the visual guidance information is generated by a service server and sent by the service server.

* * * * *